United States Patent
Monaco et al.

(10) Patent No.: US 10,577,540 B2
(45) Date of Patent: Mar. 3, 2020

(54) METHOD AND APPARATUS FOR STEAM SEPARATION OF PYROLYSIS OILS

(71) Applicant: RJ LEE GROUP, INC., Monroeville, PA (US)

(72) Inventors: Steven J. Monaco, Venetia, PA (US); Alan M. Levine, Monroeville, PA (US); Richard J. Lee, Murrysville, PA (US)

(73) Assignee: RJ LEE GROUP, INC., Monroeville, PA (US)

( * ) Notice: Subject to any disclaimer, the term of this patent is extended or adjusted under 35 U.S.C. 154(b) by 0 days.

(21) Appl. No.: 16/001,580

(22) Filed: Jun. 6, 2018

(65) Prior Publication Data
US 2019/0375991 A1  Dec. 12, 2019

(51) Int. Cl.
| | | |
|---|---|---|
| *C10G 7/00* | (2006.01) | |
| *B01D 3/38* | (2006.01) | |
| *B01D 3/42* | (2006.01) | |
| *C10B 53/07* | (2006.01) | |
| *B01L 3/14* | (2006.01) | |

(52) U.S. Cl.
CPC ............... *C10G 7/00* (2013.01); *B01D 3/38* (2013.01); *B01D 3/4205* (2013.01); *B01L 3/14* (2013.01); *C10B 53/07* (2013.01); *C10G 2300/1003* (2013.01); *C10G 2300/202* (2013.01)

(58) Field of Classification Search
CPC .......... B01D 3/14; B01D 3/38; B01D 3/4205; C10G 7/00; C10B 53/07
See application file for complete search history.

(56) References Cited

U.S. PATENT DOCUMENTS

| | | | |
|---|---|---|---|
| 2,662,052 A | 12/1953 | Bridger et al. | |
| 3,197,386 A | 7/1965 | Lau | |
| 3,702,292 A | 11/1972 | Burich | |
| 3,871,951 A | 3/1975 | Drew | |
| 4,664,786 A * | 5/1987 | Forte | B01D 3/322 203/25 |
| 4,693,810 A * | 9/1987 | Forte | B01D 3/38 208/313 |
| 4,713,089 A * | 12/1987 | Robbins | B01D 1/2856 202/205 |
| 4,783,242 A * | 11/1988 | Robbins | B01D 1/2856 159/24.3 |

(Continued)

FOREIGN PATENT DOCUMENTS

| | | | |
|---|---|---|---|
| JP | 688079 | 3/1994 | |
| JP | H 6-88079 A * | 3/1994 | ............... C10G 9/00 |

OTHER PUBLICATIONS

Murwanashyaka et al. "Separation of syringol from birch wood-derived vacuum pyrolysis oil", Separation and Purification Technology, 2001, pp. 155-165. (Year: 2001).*

(Continued)

*Primary Examiner* — Jonathan Miller
(74) *Attorney, Agent, or Firm* — Eckert Seamans Cherin & Mellott, LLC; Arnold B. Silverman

(57) ABSTRACT

Method and apparatus for processing pyrolysis oil from vehicular tires and effecting a steam distillation for separation of the pyrolysis oil to create a lighter fraction which may be subjected to fractional distillation and a heavy fraction which is usable as a fuel oil.

13 Claims, 3 Drawing Sheets

(56) References Cited

U.S. PATENT DOCUMENTS

| | | | |
|---|---|---|---|
| 4,983,278 A * | 1/1991 | Cha | C10B 47/44 |
| | | | 208/407 |
| 5,176,821 A * | 1/1993 | Forte | B01D 3/38 |
| | | | 208/313 |
| 5,229,099 A | 7/1993 | Roy | |
| 5,891,501 A | 4/1999 | McKellip et al. | |
| 6,833,485 B2 | 12/2004 | Nichols et al. | |
| 6,835,861 B2 | 12/2004 | Nichols et al. | |
| 7,276,151 B1 | 10/2007 | Okada et al. | |
| 7,341,646 B2 | 3/2008 | Nichols et al. | |
| 8,293,952 B2 | 10/2012 | Levin | |
| 8,329,229 B2 | 12/2012 | Gonzalez et al. | |
| 9,920,262 B1 * | 3/2018 | Wistrom | C10G 53/14 |
| 2005/0145418 A1 * | 7/2005 | Cordova | B01D 3/38 |
| | | | 175/66 |
| 2014/0305786 A1 * | 10/2014 | Beaver | C10B 53/07 |
| | | | 202/110 |
| 2017/0036139 A1 * | 2/2017 | Lee | B01D 3/32 |

OTHER PUBLICATIONS

M. Stanciulescu and M. Ikura (Limonene Ethers from Tire Pyrolysis Oil Part 1: Batch Experiments., J. Analytical and Applied Pyrolysis 75, pp. 217-225, 2006.).

Roy, et. al. (Production of dl-limonene by Vacuum Pyrolysis of Used Tires, J. Analytical and Applied Pyrolysis 57, pp. 91-107, 2001.).

Mphai Marvin Ngwetjana (Fractionation of tyre derived oil (TDO), Thesis—Stellenbosch Univ. Mar. 2017, (Abstract pp. ii-iii), (pp. 12-21).

Murwanashyaka, et al., "Seperation of syringol from birch wood= derived vacuum pyrolysis oil", Separation and Purification Technology 24 (2001) 155-165.

Costa, et al., Fractionation of tire pyrolysis oil into a light fuel fraction by steam distillation. Fuel vol. 241 (Dec. 21, 2019); pp. 559-563.

Pakdel, et al. "Formation of dl-Limonene in Used Tire Vacuum Pyrolysis Oils", Environmental Science & Technology, vol. 25 Issue 9 (Sep. 1, 1991) pp. 1646-1649.

* cited by examiner

METHOD AND APPARATUS FOR STEAM SEPARATION OF PYROLYSIS OILS

BACKGROUND OF THE INVENTION

1. Field of the Invention

The present invention relates to methods and apparatus for extracting an enhanced feedstock from vehicular tires by distillation from pyrolysis oil. More specifically, it relates to methods for performing an initial steam separation of the oil which establishes a lighter fraction and a heavier fraction. The lighter fraction may then be subjected to further processing such as by one or more fractional distillations. The lighter fraction can be used as produced or after further separation as a solvent or as a flavoring or scenting agent. The heavier fraction, if desired, may be employed as a solvent, fuel oil, or feedstock for a subsequent chemical process. The heavier fraction may be subjected to removal of polar components including sulfur-containing and nitrogen-containing compounds.

2. Description of the Prior Art

It has been known to subject rubber, such as scrap tires, to pyrolysis with the process producing a solid fraction such as carbon black, a liquid hydrocarbon, and a gas. The liquid hydrocarbon may have potential as a fuel oil. See U.S. Pat. Nos. 6,833,485; 6,835,861; and 7,341,646.

U.S. Pat. No. 4,983,278 discloses a two temperature pyrolysis method which employs oil recycling. It discloses creation of a light oil, heavy oil, and solid residue in a two temperature process.

U.S. Pat. No. 3,702,292 discloses distillation of a crude oil into a number of fractions followed by catalytically cracking a gas oil fraction to form propane and other fractions. U.S. Pat. No. 8,293,952 discloses a pyrolysis process where a basic metal oxide catalyst is employed and a resultant pyrolysis product is said to be high in alcohol content.

It is known that tire-derived pyrolysis oil contains valuable terpenes and other unsaturates as well as mercaptans and other sulfur containing compounds. Attempts to isolate fractions containing these compounds in a commercially viable manner have not been successful. Pyrolysis-derived oil obtained from vehicular tires tend to contain sulfur, nitrogen and oxygen containing compounds. What is derived from pyrolysis of a polymer is a complex mixture of saturated and unsaturated hydrocarbons and includes polar compounds containing sulfur, nitrogen, and oxygen. If desired, subsequent processing may be employed to separate these compounds. Due to the moderate sulfur content of these oils, they are generally used in less environmentally sensitive operations or in those that scrub their emissions to remove sulfur.

It is known that tire-derived pyrolysis oil contains valuable terpenes and other unsaturates as well as benzothiazole and other sulfur-containing compounds. However, attempts to isolate fractions containing these compounds have not yielded commercially valuable fractions. This is due to many issues arising from the complex nature of tire-derived pyrolysis oil. Attempts at direct distillation of the pyrolysis oils yield complex mixtures of compounds and result in instability during distillation. Temperature variation in the heating vessel during the distillation process may cause further instability due to broad boiling point ranges of the constituents. More significantly, pyrolysis oils yield reactive compounds that will react or crack during distillation at the high wall temperatures required by standard distillation, resulting in foaming and difficulty in controlling temperature, pressure, and separation. M. Stanciulescu and M. Ikura (Limonene Ethers from Tire Pyrolysis Oil Part 1: Batch Experiments., J. Analytical and Applied Pyrolysis 75, pp 217-225, 2006.) noted that limonene co-eluted with naphtha and proposed to react the limonene with methanol to shift its boiling point and thereby separate it from the oil. The ester would then be back-reacted. Roy, et. al. (Production of dl-limonene by Vacuum Pyrolysis of Used Tires, J. Analytical and Applied Pyrolysis 57, pp 91-107, 2001.) found that pyrolytic breakdown products of limonene along with thiophene and other sulfur compounds co-eluted with limonene and made clean separation of limonene difficult. This again shows the difficulty in isolating limonene from pyrolysis oil.

U.S. Pat. Nos. 3,871,951; 5,891,501; and 8,329,229 disclose recovery of essential oils and solvents from plant materials by steam distillation. In another process, U.S. Pat. No. 3,197,386 discloses removal of flavorous and odorous substances from oils and fats by steam distillation. In these procedures, plant and animal materials are heated directly in water or steam to vaporize oils and solvents which are then collected by condensation U.S. Pat. No. 2,662,052 discloses the steam distillation of menthol from mint oil, and plant material and crystalizing the menthol to separate it.

U.S. Pat. No. 5,892,501 discloses the extraction of mint oil from mint plants through steam distillation with the focus of the invention being applying a surfactant on the plant material prior to distillation to resist shattered and lost leaf material as the bulk of the mint oil was said to come from the leaves. The use of the surfactant was said to minimize loss of plant material during processing prior to the steam distillation. This patent does not provide any technical disclosure relevant to applicant's methods.

U.S. Pat. No. 8,329,229 discloses a method for treating the catmint plant in recovery of oils through a multi-stage process which initially employs steam to establish a volatilized mixture of catmint oil and water followed by processing of catmint oil dissolved in water and mixture with the salt also dissolved in the water. It is not directed toward applicant's problem and is not relevant to a solution of the same. See, also, U.S. Pat. No. 3,871,951 which discloses the use of steam distilling to recover turpentine from wood chips while the wood chips are immersed in aqueous alkaline solution.

It is also been known to attempt to isolate terpenes by steam distillation of orange peels and other crop scrap. Such uses present a different problem from the processing of vehicular tire derived pyrolysis oil. However, it would not be obvious to apply this technique to pyrolysis oils.

U.S. Pat. No. 9,920,262 discloses several embodiments of methods of separation of pyrolysis oils. It discloses various combinations which employ two to three phases of the process. Phase I involves a first separation which creates a lighter fraction and a heavier fraction. The lighter fraction is subjected to plate distillation and the heavier fraction is subjected to removal of sulfur and nitrogen compounds in order to facilitate the use of the heavier fraction as heavy fuel oil. A preferred starting material is obtained from vehicular tires. In the initial Phase I portion of the process, thin film distillation is effected in a preferred approach. In a second stage of separation, a lighter fraction emerging from the first separation is subjected to plate distillation. In a third phase, the heavy fraction may be subjected to sulfur and nitrogen removal.

There remains, therefore, a real and substantial need for methods and apparatus for treating pyrolysis oil to effect separation of (a) commercially meaningful fractions from (b) other fractions suitable for use as a solvent, fuel oil, or a feedstock for a subsequent chemical process.

SUMMARY OF THE INVENTION

The present invention provides a simple and cost effective solution to the shortcomings of the hereinbefore discussed prior art by providing an effective method and apparatus for processing pyrolysis oil to produce a light fraction containing high value products, such as limonene, and a heavy fraction for use as a fuel oil or for further processing. This is followed by a second phase subjecting the lighter fraction to fractional distillation to separate the commercially desirable products. The heavier fraction may be subjected to an extraction to produce an effective solvent, fuel oil, or a feedstock for other chemical processes, as well as a product suitable for use in such products as asphalt. A preferred initial separation of the pyrolysis oil involves a steam distillation as this effectively and economically produces the desired first stage of separation. Certain preferred parameters with respect to the steam distillation and fractional distillation are disclosed.

Steam distillation is a sub-group of co-distillation techniques that separate compounds based on their vapor pressures as well as boiling points. In the present invention, water is a preferred co-solvent which permits separations to be tailored to a desired group of compounds.

It is an object of the present invention to expose the pyrolysis oil to a substantially lower temperature than required for bulk distillation and achieve the desired separation without encountering undesired cracking and coking reactions. It is a further object of the present invention depending upon specific purity objectives of a particular end use, to use steam distillation without subsequent column distillation.

Depending on the specific purity requirements the secondary distillation may either be simple or compound.

It is a further object of the present invention to provide efficient methods and apparatus for separating pyrolysis oil into a first portion which is a lighter phase and has enhanced marketability and a second portion which provides a marketable fuel product.

It is an object of the present invention to provide for effective processing of pyrolysis oil employing an initial steam distillation phase.

It is another object of the present invention to effect initial steam separation of pyrolysis oil into a commercially viable feedstock for subsequent distillation and a heavy fraction with a more acceptable flashpoint and fewer highly volatile compounds than the feedstock pyrolysis oil.

It is a further object of the present invention to provide enhanced efficiency in the first stage distillation to produce the lighter fraction by eliminating the need to use thin film distillation.

It is another object of the invention to produce from the pyrolysis oil light fraction a high purity limonene having a purity of about 90 to 95 percent.

It is a further object of the present invention to provide such a method and apparatus which avoids high temperature exposure of terpenes which are sensitive to heat and decomposition.

It is another object of the present invention to provide such a method and apparatus which has a terpene mixture of at least 90 percent purity.

These and other objects of the invention will be more fully understood from the following detailed description of the invention on reference to the illustrations appended hereto.

DESCRIPTION OF THE PREFERRED EMBODIMENTS

As employed herein, the term "fractional distillation" means distillation in order to effect a desired separation and shall expressly include, but not be limited to the use of, distillation plates, packing, refluxing as well as combinations thereof.

As employed herein, the term "theoretical plate" or "theoretical plates" will be employed in the conventional sense as well known to those skilled in the art. "Theoretical plates" relate to distillation columns which can have a number of physical trays or plates or be filled with packing material both of which promote contact between the liquid or vapor phases in the column. The number of theoretical plates is essentially the actual number of plates in the case of a column of trays divided by the efficiency of each plate which is less than one, or, the bed height divided by what is known as "equivalent theoretical plate height" in the case of a packed bed. This may be accomplished in a single column or through sequential use of two or more columns.

Figure 1:
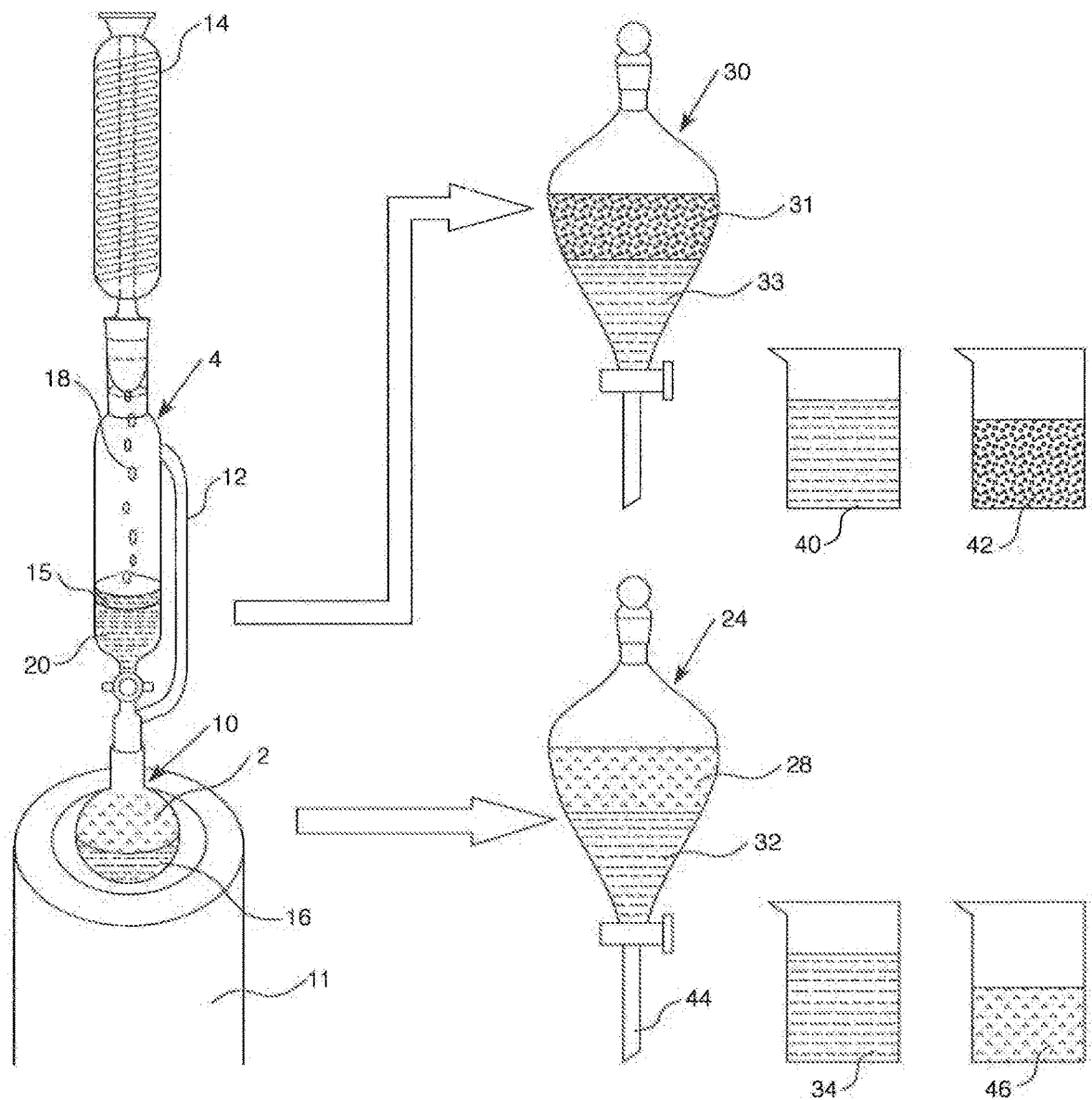
FIG. 1 is a schematic diagram showing apparatus and a related method for an embodiment of Phase 1 of the invention employing a small scale steam distillation apparatus.

Referring to FIG. 1, which illustrates schematically an initial phase small scale batch separation of pyrolysis oil through steam distillation. This initial phase results in separation of the pyrolysis oil into a lighter fraction and a heavier fraction with the lighter fraction containing terpenes including limonene. In this illustration, raw pyrolysis oil 2 in vessel 10 is added to water 16 to produce a water-oil ratio of between about 1:1 to 6:1 and preferably about 3:1 to 5:1. The material is collected in flask 10 which is heated by heating mantle 11 to boil the water. The vapors rise through side arm 12 of vessel 4 and are condensed by condenser 14. The condensed vapor droplets 18 fall under the influence of gravity through vessel 4. The liquid collected in vessel 4 will consist of a terpene-containing solvent layer 15 on top of a water layer 20. When the solvent layer 15 stops accumulating, the heat is turned off and the system is allowed to cool to a temperature at which it can be handled safely. The material collected in flask 10, consisting of bottoms heavy oil 2 and water 16, is then delivered into a separately funnel 24. It will consist of bottom oil heavy fraction 28 and bottom water fraction 32. The material collected in flask 4, consisting of tops light oil 15 and water 20, is then drained into a second separatory funnel 30. It will consist of tops oil light fraction 31 and bottom water fraction 33. The light oil and water fractions in separatory funnel 30 are separated into vessels 40 and 42, with 42 containing the lighter fraction 31 and vessel 40 containing the water portion 33 from second separatory funnel 30. The heavy oil and water fractions in separatory funnel 24, which has outlet 44, are separated into vessels 34 and 46, with 46 containing the heavy oil fraction 28 and vessel 34 containing the water portion 32 from second separatory funnel 24. The water fractions contained in vessels 40 and 34 can be reused in another batch until they become too contaminated for reliable use. After that, they can be treated or cleaned such as by distillation for further use. The bottom steam distillation oil heavy fraction 28 delivered to vessel 46 may be employed as a fuel oil, a solvent, or as a feedstock in a further purification or other operation. The top steam distillation lighter oil fraction 42, which contains the terpenes and solvent fraction, may be separated further using a fractional distillation apparatus such as that described hereinafter and shown in FIG. 3, for example. As shown in schematic FIG. 1, the water has been separated into vessels 40 and 34 while the top and bottom oil fractions are separately contained in vessels 42 and 46, respectively.

In one example the processed pyrolysis oil produced from scrap tires generated a lighter fraction which was about 20 to 35 weight percent of the oil and a heavy fraction which was about 65 to 80 weight percent of the pyrolysis oil.

Figure 2:
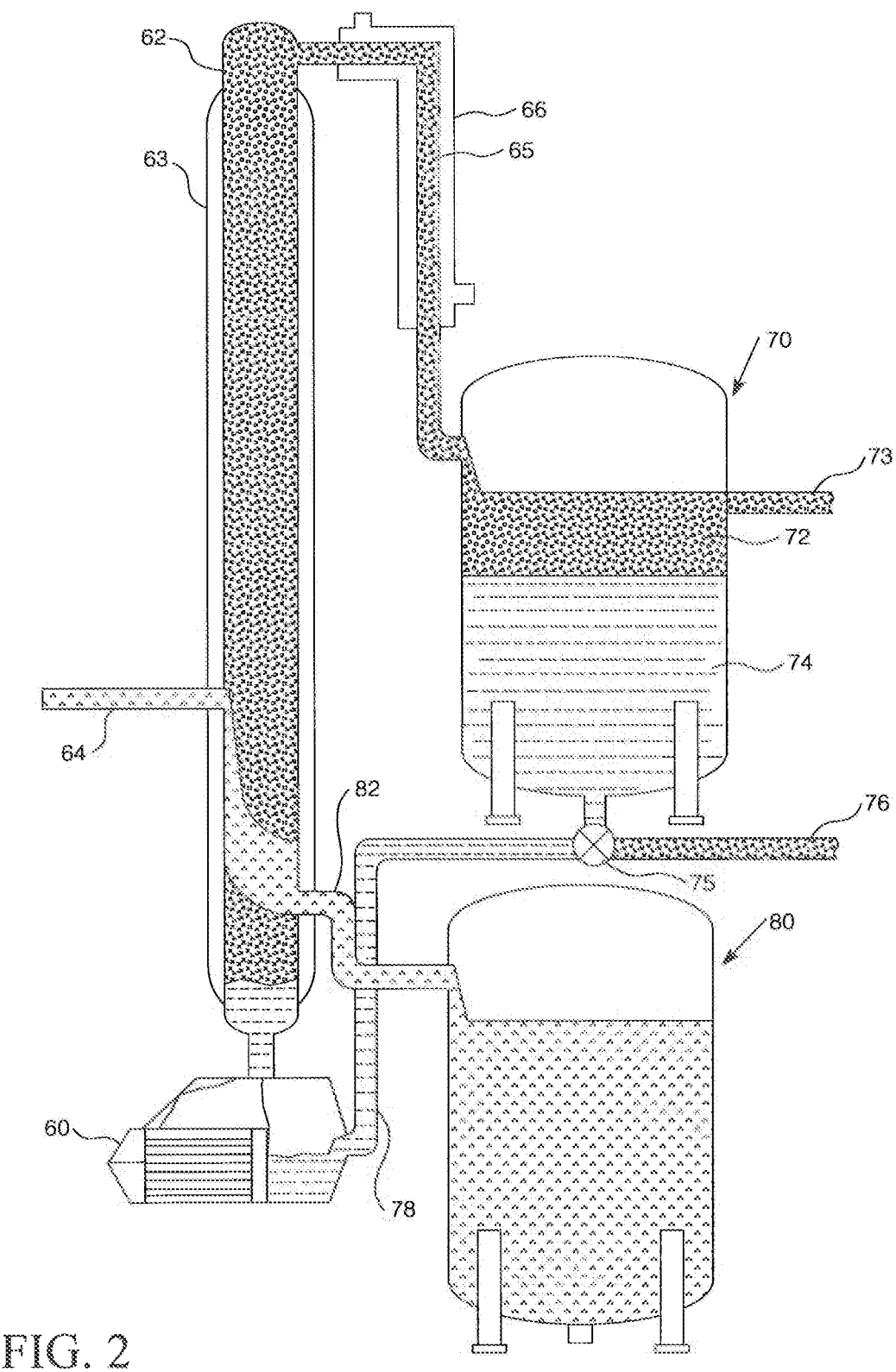
FIG. 2 is a schematic diagram showing apparatus and a related method for an embodiment of Phase 1 of the invention employing an industrial steam distillation apparatus.
Figure 3:
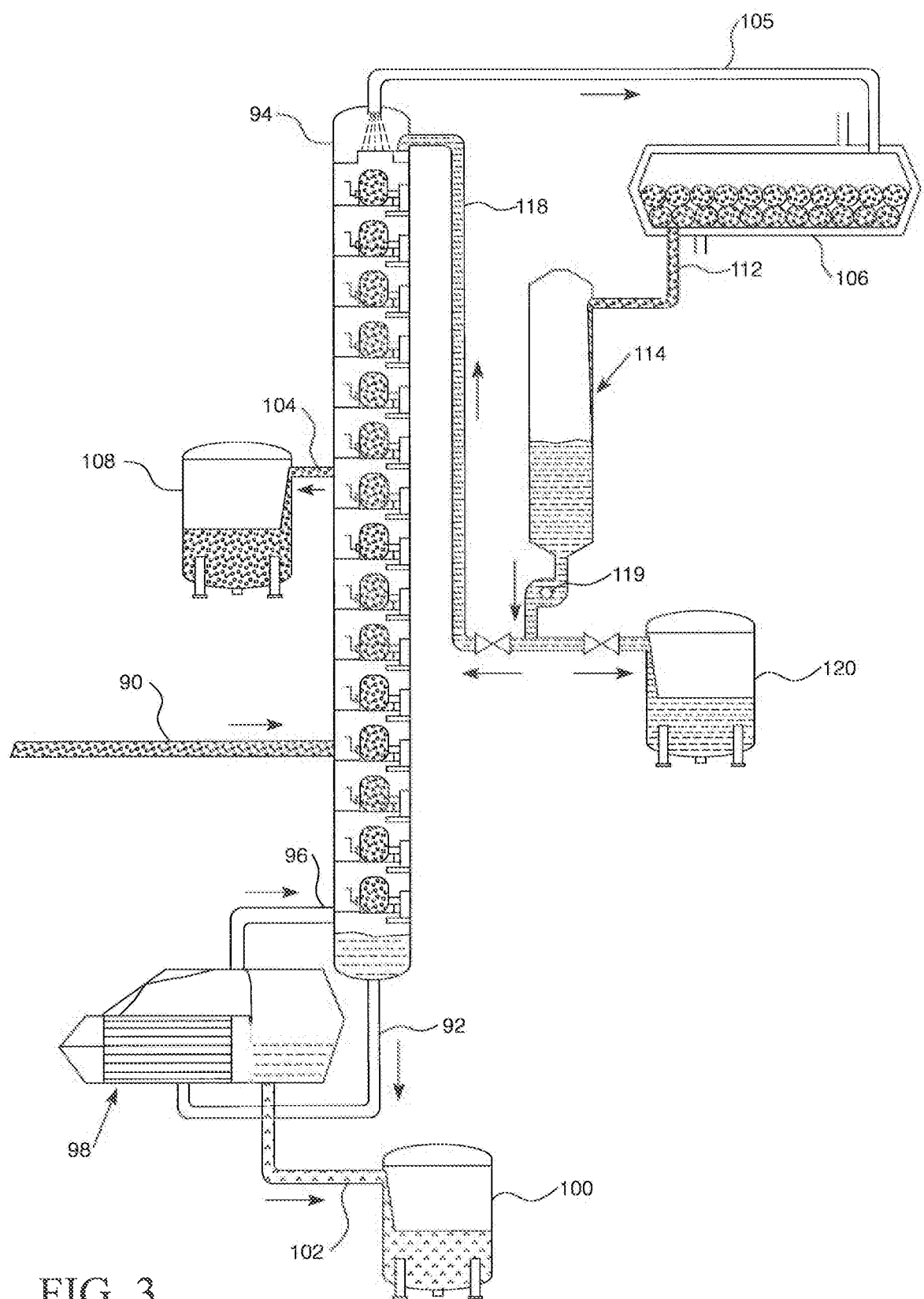
FIG. 3 is a schematic diagram showing apparatus and a related method for an embodiment of Phase 2 of the invention employing a fractional distillation apparatus.

Referring to FIG. 2, it illustrates schematically one embodiment of a continuous method for the separation of pyrolysis oil through an initial steam distillation. Steam generator 60 is started and delivers steam to insulated or temperature controlled column 62. Column 62 may be filled with any appropriate packing material. Once steam exits column 62, which is insulated or heated jacket 63, pyrolysis oil feedstock is added to the column through the feed port 64, preferably entering the column 62 within the bottom half portion of the column 62 or more preferably within the bottom third portion of the column 62. The oil, which may be preheated, is heated in column 62 by the steam in the column 62. If additional heat is desired, external heaters in jacket 63 may be employed. The terpene-containing lighter fraction is separated from the oil and moves up the column 62 with the steam. The steam and water exit and terpene-containing lighter fraction exit at the top of column 62 flow through pipe 65 and are liquefied in condenser 66. They flow by gravity into tank 70. The terpene-containing lighter fraction 72 which contains limonene and the water fraction 74 are immiscible and separate into two layers with the lighter layer 72 on top. The water is drained through valve 75, which is set in a first position to deliver water output from tank 70 through pipe 78 for reuse in the steam generator 60. When valve 75 is in a second position after the water 74 has been removed from tank 70, it delivers the lighter fraction 72 through pipes 76 and 90 (FIG. 3) to column 94. In a third position, the valve 75 is closed. After the water fraction is emptied, valve 75 is set to a second position to divert the lighter fraction 72 through pipe 76 and 90 (FIG. 3) or alternately from a side port 73 in tank 70 to fractional distillation column 94 (FIG. 3). The pyrolysis oil moves down through the column 62 under the influence of gravity and is stripped of the lighter species by the steam, and is delivered to tank 80 through a side draw pipe 82. The stripped terpene-containing light fraction 72 moves up the column 62 by evaporation and is delivered to tank 70 through pipe 65. The stripped terpene-containing lighter fraction 72 can be either delivered to the fractional distillation column 94 through pipe 90 (FIG. 3) which operatively associated with pipe 76 or side port 73 (FIG. 2).

FIGS. 1 and 2 provide an initial separation, of the pyrolysis oil, through steam distillation of vehicle tire-derived pyrolysis oil. FIGS. 1 and 2, respectively, illustrate batch and continuous processes for the first Phase of separation. FIG. 1 illustrates a batch Phase 1 process, provides an initial separation of pyrolysis oil through steam distillation of vehicle tire-derived pyrolysis oil. FIG. 2, which is a continuous Phase 1 process, provides an initial separation of pyrolysis oil through steam distillation of vehicle tire-derived pyrolysis oil.

The processes of FIGS. 1 and 2 are initial separations which produce: (a) a light fraction which contains most of the commercially valuable compounds including, but not limited to, terpenes, toluene, xylenes, and cyclohexenes as well as (b) a heavy fraction which can be used as a solvent, fuel oil, process oil, or feedstock for further processing.

Referring to FIG. 3 which provides an illustration of a second separation phase of the pyrolysis oil steam distillation lighter fraction or top fraction 72 (FIG. 2) through fractional distillation. The terpene-containing lighter fraction 72 from the top of the steam distillation process is delivered through feed tubes 76 (FIG. 2) to 90 (FIG. 3) and to distillation column 94. The terpene fraction will contain limonene and may contain other additional species of terpene. The distillation column 94 may contain packing or plates that are equivalent to about 2 to 60 theoretical plates and preferably about 15 to 30 theoretical plates.

A reflux system 112, 113, 118 at the top of column 94 is provided. The reflux system has a control head preferably set at about a 2:1 to 10:1 ratio. The heavy fraction from the terpene-containing solvent feedstock drops down through pipe 92 and is heated in the re-boiler 98. Any remaining light fraction portion is returned to the fractional distillation column 94 through pipe 96 and the heavy portion drops through pipe 102 to vessel 100 under the influence of gravity. Side draws such as 104 which is operatively associated with collection vessel 108 can be added to the system if withdrawal of intermediate fractions is desired. To collect a limonene fraction, for example, the top of the column 94 is set to between about 176.3° C. to 177.1° C. when run at atmospheric pressure. The top fraction is refluxed at a rate of at least about 4 to 8 times the flow rate in column 94. The top vapor is delivered through pipe 105 and condensed in condenser 106. The output of the condenser 106 is delivered by pipe 112 to vessel 114. The output from vessel 114 is delivered under the influence of pump 119 through pipe 118 to the top of column 94 or directly into tank 120, as selected and indicated by the two arrows pointing in opposite directions and the associated valves shown above the same. The fractional distillation column 94 can be run under vacuum and at a lower temperature to avoid high temperature exposure of terpenes which are susceptible to decomposition at elevated temperatures. For example, the column 94 can be operated at between room temperature at about 20° C. and 132° C. if operated at 150 torr. Under these conditions, limonene fractionates at between about 121.3° C. and 122° C.

FIG. 3 involves a second stage of the method. The output from FIG. 1 or FIG. 2, is subjected to a fractional distillation system with a split reflux which recovers the commercially valuable components of the pyrolysis oil from the lighter fraction received from the processes of FIG. 1 or 2.

The initial steam distillation such as is produced by the method of FIG. 1 or 2 produces a lighter fraction which preferably contains at least one material selected from the group consisting of terpenes, toluene, xylenes, mercaptans, cyclohexenes, and an alkylated monocyclic hydrocarbon fraction. The subsequent fractional distillation, as illustrated and described in connection with FIG. 3, of the lighter fraction separates the lighter fraction further and, thereby, concentrates the limonene. Limonene as well as other terpene species has numerous uses including, but not limited to uses in flavoring, enhanced fragrances, solvents, and antimicrobial and various medicinal uses. The pyrolysis oil generally has a lighter fraction which preferably has about 20 to 35% the weight of the pyrolysis oil and the heavy fraction which has about 65 to 80 weight percent of the pyrolysis oil.

EXAMPLE

The second phase of the preferred method as shown in FIG. 3 is considered in this example wherein the lighter fraction emerging from the steam distillation is subjected to further processing.

This example applies two temperature/pressure profiles to fractionate the components into cuts of interest. The system pressure is set initially to a range of 100-400 torr absolute with a preferred setting of about 300 torr for collection of the overhead fraction, starting from approximately 20° C. to 25° C. until the distillate reaches between about 134° C. and 145° C., and preferably between 139° C. and 141° C. This fraction can be split into several cuts based on temperature. An example is as shown in TABLE 1.

TABLE 1

| Fraction | Temp (° C.) | Preferred Temp (° C.) | Pressure (torr) |
|---|---|---|---|
| Cut 1 | Start-115 | Start-105.8 | 300 |
| Cut 2 | 106-138 | | 300 |
| Cut 3 | 139-141 | | 300 |

As system pressure decreases the boiling point decreases. As system pressure increases, the boiling point increases. The Clausius-Clapeyron equation which is well known to those skilled in the art may be used to describe the relationship between pressure, latent heat (or enthalpy) of vaporization and temperature to thereby permit an estimate of the boiling point of the substance. The system can be operated at different vacuum levels with corresponding temperature adjusted to produce the desired output.

The described cuts in TABLE 1 consist of several low boiling point, highly volatile solvent chemicals. These include, but are not limited to, xylene, toluene, and styrene. This makes the individual as well as the combined fraction(s) extremely valuable in the industrial market.

After collection of fractions up to 141° C. at the preferred pressure of 300 torr, the temperature is allowed to cool to room temperature and the pressure decreased to a range of 100-300 torr with a preferred setting of 150 torr. A cut is made at 115° C.-125° C., more preferably between 119° C. and 123° C. at the preferred pressure and is either added to the prior lower temperature cut or kept separate as a less volatile solvent solution. The next split is collected by continuing to apply heat until the temperature reaches 124° C. to 127° C., more preferably between 125° C. to 126° C. At the preferred pressure, this cut contains the bulk of the limonene and p-cymene and is collected as a single separate fraction.

A single fraction up to 132° C. is then collected as a clearing cut to ensure that all the high value material is extracted in this process. A generalized description at preferred conditions for the splits are as shown in TABLE 2.

TABLE 2

| Fraction | Temp (° C.) | Preferred Temp (° C.) | Vacuum (torr) |
|---|---|---|---|
| Cut 4 | | 20-121.2 | 150 |
| Cut 5 | 118-128 | 121.3-122 | 150 |
| Cut 6 | | 122-131.5 | 150 |

The resulting fractions can be combined or maintained separately to provide fractions containing high volatile solvent chemicals and/or essential oils at various purities.

Whereas, particular embodiments of this invention have been described herein for purposes of illustration. It will be evident to those skilled in the art that numerous variations of the details of the present invention may be made without departing from the invention as defined in the appended claims.

What is claimed is:

1. A method of processing pyrolysis oil comprising:
   providing said pyrolysis oil from vehicular tires,
   effecting steam distillation of said pyrolysis oil to create a first separation,
   effecting by said first separation of said pyrolysis oil separation into a lighter fraction and a heavier fraction,
   subjecting said lighter fraction to fractional distillation, and
   said heavy fraction being usable as a fuel oil.

2. The method of claim 1 including,
   employing about 10 to 30 theoretical plates in said fractional distillation.

3. The method of claim 1 including,
   employing about 2 to 60 theoretical plates in said fractional distillation of said pyrolysis oil.

4. The method of claim 1 including,
   employing about 15 to 30 theoretical plates in said fractional distillation.

5. The method of claim 1 including,
   said oil with said lighter fraction being about 20 to 35 percent weight of said pyrolysis oil and said heavy fraction being about 65 to 80 weight percent of said pyrolysis oil.

6. The method of claim 1 including,
   said lighter fraction containing at least one material selected from the group consisting of terpenes, toluene, xylenes, mercaptans, cyclohexenes and alkylated monocyclic hydrocarbon fractions.

7. The method of claim 1 including,
   effecting by said fractional distillation separation of at least one material selected from the group consisting of terpenes, toluene, xylenes, mercaptans, cyclohexenes, and an alkylated monocycle fractions.

8. The method of claim 3 including,
   effecting said fractional distillation in a column having a reflux control head.

9. The method of claim 8 including,
   effecting said fractional distillation with said reflux control head set at about a 2:1 to 10:1 ratio.

10. The method of claim 1 including,
    said lighter fraction is a mixture containing at least one terpene.

11. The method of claim 10 including,
    said terpene mixture having a purity of at least 90 percent.

12. The method of claim 10 including,
    said terpene mixture containing limonene.

13. The method of claim 12 including,
said limonene having a purity of about 90 to 95 percent.

\* \* \* \* \*